(12) United States Patent  
Zeng et al.

(10) Patent No.: US 7,206,141 B2
(45) Date of Patent: Apr. 17, 2007

(54) IMAGE PICK-UP LENS SYSTEM

(75) Inventors: Ji-Yong Zeng, Beijing (CN); Ying-Bai Yan, Beijing (CN); Guo-Fan Jin, Beijing (CN); Zhuo Wang, Beijing (CN); Min-Qiang Wang, Beijing (CN)

(73) Assignees: Tsinghua University, Haidian District, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 128 days.

(21) Appl. No.: 11/018,711

(22) Filed: Dec. 20, 2004

(65) Prior Publication Data

US 2006/0056072 A1   Mar. 16, 2006

(30) Foreign Application Priority Data

Aug. 27, 2004   (CN)   ................. 2004 1 0051296

(51) Int. Cl.
    G02B 13/18   (2006.01)
    G02B 5/18    (2006.01)
    G02B 21/02   (2006.01)

(52) U.S. Cl. ................. 359/717; 359/566; 359/661
(58) Field of Classification Search ........... 359/661, 359/717, 566
    See application file for complete search history.

(56) References Cited

U.S. PATENT DOCUMENTS

| 6,055,105 A | 4/2000 | Boku et al. ............... 359/566 |
| 6,191,889 B1 * | 2/2001 | Maruyama ............... 359/566 |
| 6,297,915 B1 | 10/2001 | Kaneko et al. ............ 359/718 |
| 6,449,105 B1 | 9/2002 | Dou ........................ 359/793 |
| 6,992,838 B2 * | 1/2006 | Park ........................ 359/719 |
| 7,027,234 B2 * | 4/2006 | Kim et al. ................ 359/717 |
| 7,038,861 B2 * | 5/2006 | Ninomiya et al. ........ 359/719 |
| 2003/0117709 A1 | 6/2003 | Nakamura et al. ........ 359/565 |
| 2003/0117723 A1 | 6/2003 | Shinohara ................. 359/794 |
| 2004/0036983 A1 | 2/2004 | Ninomiya et al. ........ 359/719 |

FOREIGN PATENT DOCUMENTS

| EP | 0819952 A2 | 1/1998 |
| EP | 1357414 A1 | 10/2003 |
| WO | WO 96/17265 | 11/1995 |

* cited by examiner

Primary Examiner—Scott J. Sugarman
(74) Attorney, Agent, or Firm—Morris Manning & Martin LLP; Tin Tingkang Xia, Esq.

(57) ABSTRACT

An image pick-up lens system includes an aperture stop (10), a first lens (20), and a second lens (30) having a concave surface on an object side. The aperture stop, the first lens and the second lens are aligned in that order from the object side to an image side. The first lens has positive refracting power and has a diffraction grating formed on a convex surface on the image side. The second lens has positive refracting power. The system satisfies the following condition: (1) $1.4 < T/f < 1.7$, wherein f is a focal length of the system, and T is a length from the aperture stop to an image pick-up surface (50) of the image side. Condition (1) limits the total length of the system in order to provide compactness. The system also satisfies other conditions (2)–(5) as disclosed, in order to provide compactness, cost-effectiveness and improved optical performance.

20 Claims, 12 Drawing Sheets

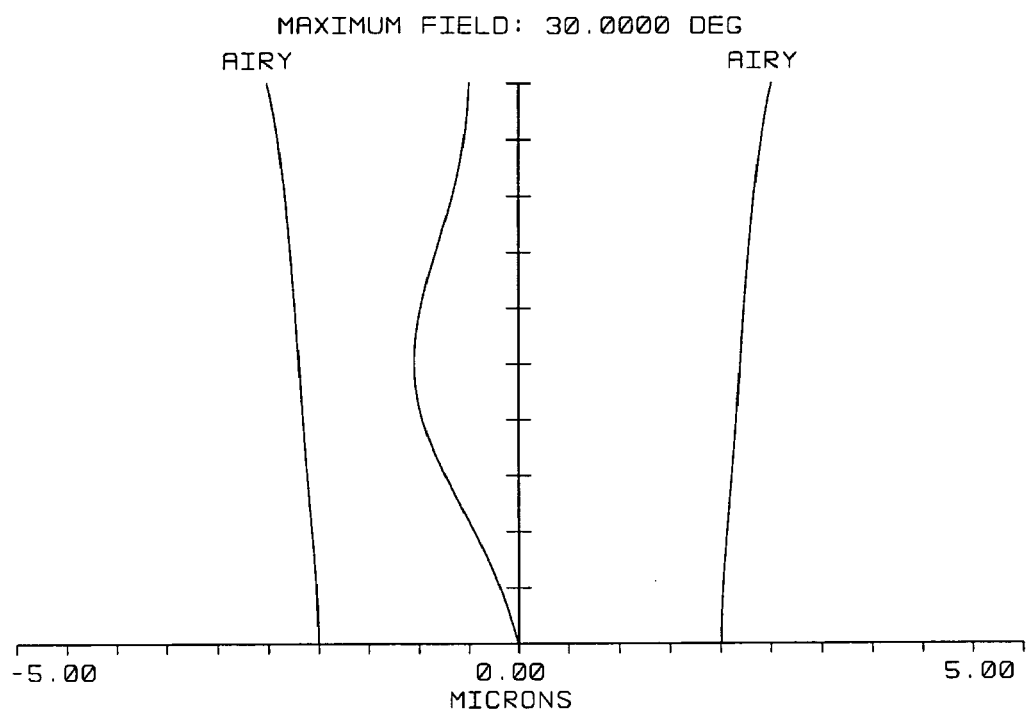
Fig. 11
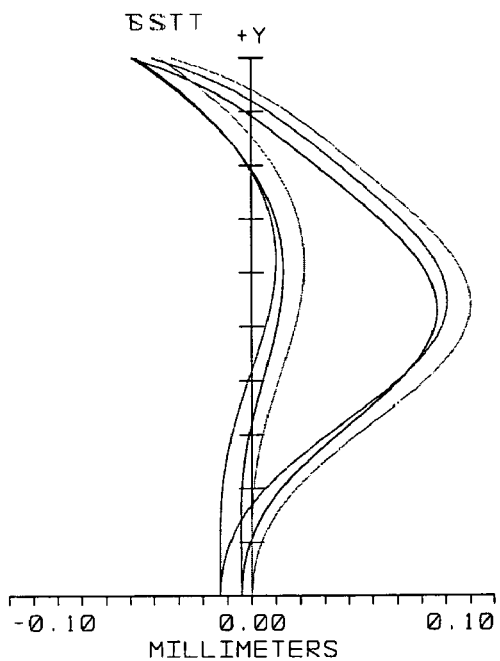 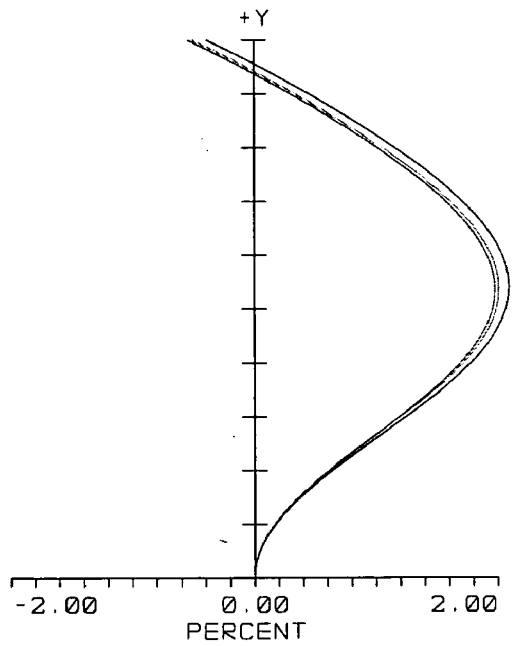
Fig. 12A                    Fig. 12B

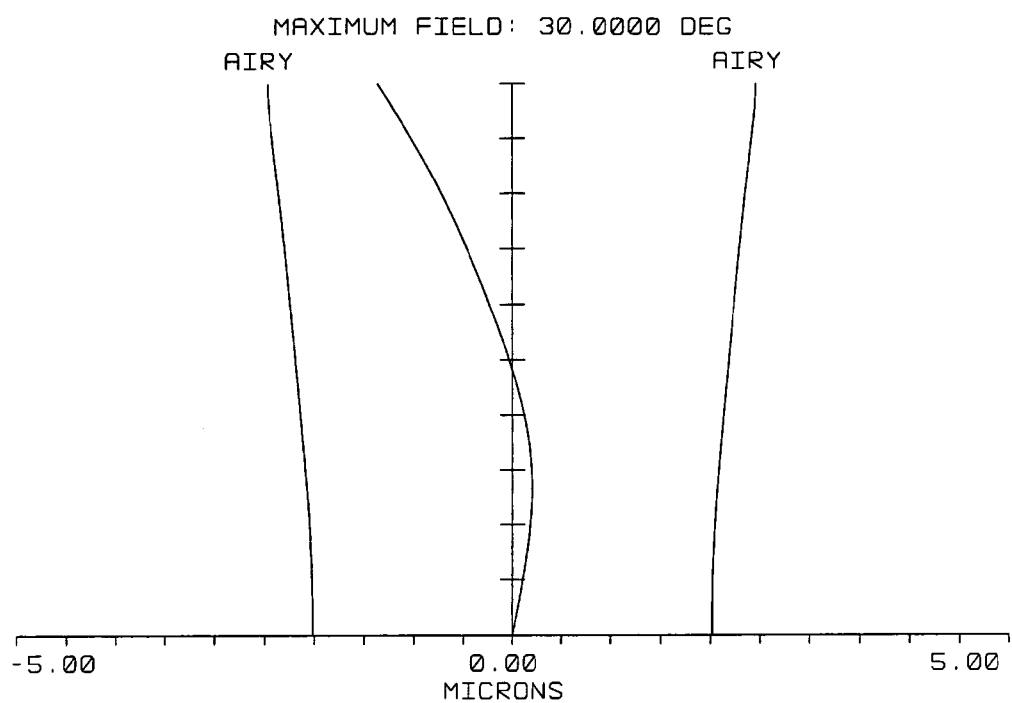
Fig. 17
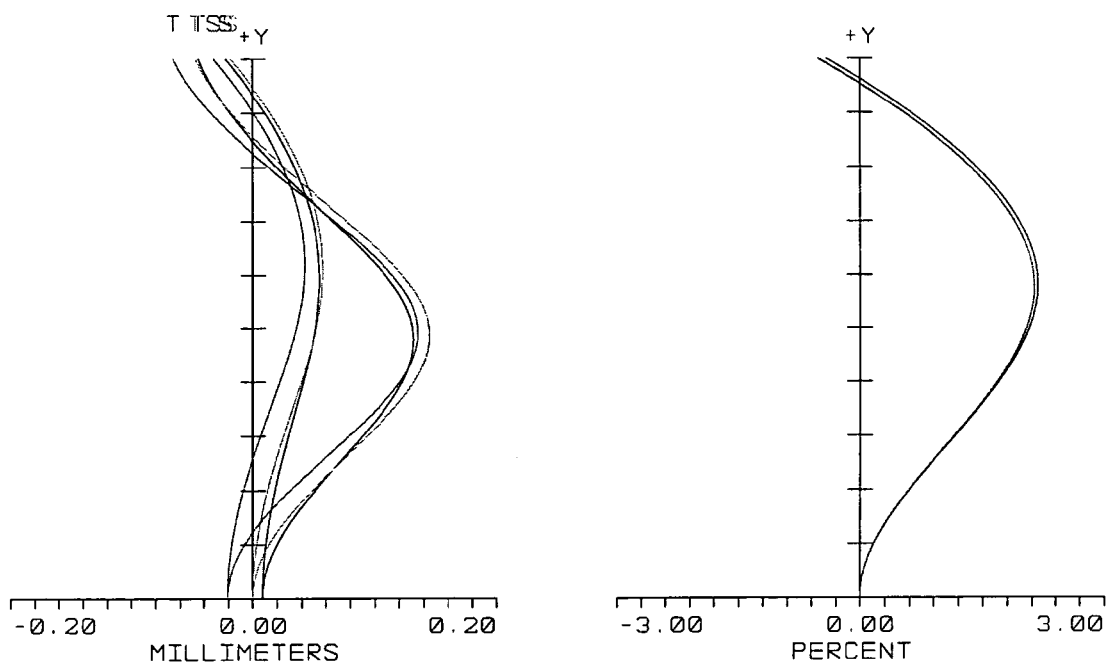
Fig. 18A                    Fig. 18B

IMAGE PICK-UP LENS SYSTEM

TECHNICAL FIELD

The present invention relates to an image pick-up lens system which projects an image of an object onto an image pick-up surface, the image pick-up lens system being suitable for use in products such as camera modules.

BACKGROUND

In recent years, camera modules for taking photos have begun to be incorporated in portable terminals such as mobile phones and laptop computers. Downsizing the camera modules is a prerequisite for enhancing the portability of these apparatuses. The camera module operates with an image pickup device such as a CCD (Charged Coupled Device) or a CMOS (Complementary Metal Oxide Semiconductor). Recently, a pixel having the size of approximately a few micrometers has become commercially feasible, and an image pickup device with high resolution and a compact size can now be mass manufactured and marketed. This is accelerating the demand for downsizing of image pick-up lens systems so that they are able to be suitably used with miniaturized image pickup devices. It is also increasing expectations of cost reductions in image pick-up lens systems, commensurate with the lower costs enjoyed by modern image pickup devices. All in all, an image pick-up lens system needs to satisfy the oft-conflicting requirements of compactness, low cost, and excellent optical performance.

Compactness means in particular that a length from a lens edge of the lens system to an image pick-up surface should be as short as possible.

Low cost means in particular that the lens system should include as few lenses as possible; and that the lenses should be able to be formed from a resin or a plastic and be easily assembled.

Excellent optical performance can be classified into the following four main requirements:

First, a high brightness requirement, which means that the lens system should have a small F number (FNo.). Generally, the FNo. should be 2.8 or less.

Second, a wide angle requirement, which means that half of the field of view of the lens system should be 30° or more.

Third, a uniform illumination on the image surface requirement, which means that the lens system has few eclipses and/or narrows down an angle of incidence onto an image pick-up device.

Fourth, a high resolution requirement, which means that the lens system should appropriately correct fundamental aberrations such as spherical aberration, coma aberration, curvature of field, astigmatism, distortion, and chromatic aberration.

In a lens system which satisfies the low cost requirement, a single lens made from a resin or a plastic is desired. However, it is difficult for the single lens system to correct chromatic aberration and achieve excellent optical performance, especially if a wide angle of view such as 70° is desired. Thus, a hybrid diffractive-refractive single lens system is employed to correct chromatic aberration caused by refraction of the lens material. Typical such lens systems can be found in U.S. Pat. No. 6,055,105B1, U.S. Pat. Application Publication No. U.S. 2003/0117709A1 and EP Pat. No. 0819952A2. However, it is still difficult to achieve excellent optical performance in a wide angle of view. For example, distortion, field curvature and astigmatism of the system cannot be optimally corrected. Thus, the hybrid diffractive-refractive single lens system can generally only be used in a low-resolution image pickup device such as a CMOS.

In a lens system which satisfies the excellent optical performance requirement, two or even more lenses are desired. A typical two-lens system can be found in U.S. Pat. Application Publication Nos. 2003/0117723 and 2004/0036983, and EP Pat. No. 1357414A1. In order to correct chromatic aberration, the two lenses of the system must be made from different materials, with the lenses having a relatively large difference being their respective Abbe constants. Because there are only a few varieties of plastic and resin materials which can be suitably used to make lenses, even if the two lenses are made from a different plastic or resin material, the range of variation of optical properties of the two lenses is limited. This makes it difficult to effectively correct chromatic aberration. Therefore, in most two-lens systems which have excellent optical performance, at least one of the lenses is made from optical glass. As a result, such systems generally yield limited cost efficiency and lightness in weight.

With further developments in lens molding technology, it is now possible to mass manufacture plastic lenses with aspheric surfaces and plastic lenses with diffractive surfaces. Therefore, hybrid diffractive-refractive two-lens systems having the lenses made from a plastic or a resin material are being developed. Such lenses can correct chromatic aberration caused by refraction of the lens material, as well as enjoy reduced manufacturing costs. A well-known hybrid diffractive-refractive two-lens system is the retro-focus type lens system. The lens system comprises, from an object side to an image side, a first lens having negative refracting power, a stop, and a second lens having positive refracting power. A typical such lens system can be found in U.S. Pat. No. 6,055,105 and in WO App. No. 96/17265. The lens system helps correct wide angle of view aberrations. However, a shutter is positioned between the second lens and the image side, which adds to the distance between the second lens and the image side. Thus, the compactness of the lens system is limited.

Another important consideration is that plastic and resin materials are prone to absorb water. For example, the water absorbency of polymethyl methacrylate (PMMA) is 1.5%, and the water absorbency of polycarbonate (PC) is 0.4%. Among the plastic or resin materials which can be suitably used to make lenses, only zeonex materials (polyolefin resins or cyclo-olefin polymers) have relatively low water absorbency. The water absorbencies are less than 0.01%. Zeonex materials are available from the Japanese Zeon Corporation. Therefore unless a non-glass lens is made from a zeonex material, it is liable to absorb water and deform. As a result, the optical performance of the lens system is diminished.

Therefore, a low cost image pick-up lens system which has a compact configuration and excellent optical performance is desired.

SUMMARY OF THE INVENTION

Accordingly, an object of the present invention is to provide an image pick-up lens system which can optimally correct fundamental aberrations.

Another object of the present invention is to provide an image pick-up lens system which has a relatively short total length.

A further object of the present invention is to provide an image pick-up lens system which is cost-effective.

To achieve the above-described objects, an image pick-up lens system in accordance with the present invention comprises an aperture stop, a first lens, and a meniscus-shaped second lens having a concave surface on an object side. The aperture stop, the first lens and the second lens are aligned in that order from the object side to an image side. The first lens has positive refracting power and has a diffraction grating formed on a convex surface on the image side. The second lens has positive refracting power.

Alternatively, an image pick-up lens system in accordance with the present invention comprises an aperture stop, a first lens, and a meniscus-shaped second lens having a concave surface on an object side. The aperture stop, the first lens and the second lens are aligned in that order from the object side to an image side. The first lens has positive refracting power and has a diffraction grating formed on a convex surface on the image side. The second lens has negative refracting power.

According to a first aspect of the invention, the following condition is satisfied:

$$1.4 < T/f < 1.7, \quad (1)$$

wherein, f is a focal length of the system, and T is a length from the aperture stop to an image pick-up surface of the image side. Preferably, a surface of the first lens on the object side is aspheric.

More preferably, at least one surface of the second lens is aspheric. Even more preferably, the second lens is aspheric on both surfaces.

According to a second aspect, in order to correct monochromatic aberration and satisfy the compactness requirement, the following conditions are satisfied:

$$0.5 < f1/f < 0.8, \text{ and} \quad (2)$$

$$0.002 < R2/R1 < 0.300, \quad (3)$$

wherein, f1 is a focal length of the first lens, R1 is an absolute value of a radius of curvature of a first surface of the first lens on the object side, and R2 is an absolute value of a radius of curvature of a second surface of the first lens on the image side.

According to a third aspect, in order to correct field curvature, the following condition is satisfied:

$$-0.5 < R3/[f \times (n-1)] < -0.2, \quad (4)$$

wherein, R3 is an absolute value of a radius of curvature of a third surface of the second lens on the object side, and n is the refractive index of a material of the second lens.

Further, to correct chromatic aberration and make the lenses relatively easy to manufacture, the following condition is satisfied:

$$-450 < C_2 \times (f1/R_n^2) < 250, \quad (5)$$

wherein, $C_2$ is the power phase coefficient of the phase function of the diffraction grating surface of the first lens, and $R_n$ is a normalization radius of the diffraction grating.

Further still, the first and second lenses are made from a same plastic or a same resin. The same plastic or the same resin is a zeonex material.

Because the first lens is positioned adjacent the aperture stop and has the aspheric surface on the object side, the image pick-up lens system can appropriately correct spherical aberration. With the diffraction grating formed on the surface of the first lens on the image side, the lens system can appropriately correct coma aberration. In addition, because the second lens is positioned away from the aperture stop and has at least one aspheric surface, different chief rays of different field angles can have very different corresponding projection heights at the second lens. Therefore, the system can appropriately correct astigmatism, field curvature and distortion, all of which are related to the angle of field of view. Furthermore, the fourth surface of the second lens has gradually varying refractive characteristic from a central portion thereof near an optical axis of the system to a peripheral edge portion thereof. Thus, the central portion of the second lens diverges light rays and the peripheral edge portion of the second lens converges light rays, so that the meridional/sagittal sections easily coincide. For all the above reasons, the optical image performance in wide angles of the system is enhanced. Further, because the first and second lenses are made from a same plastic or a same resin, the manufacturing cost is reduced. Moreover, because the lenses are made from the zeonex material, reduction of the optical performance of the lens system due to deformation of the lenses caused by absorbing water is prevented.

Other objects, advantages and novel features of the present invention will become more apparent from the following detailed description when taken in conjunction with the accompanying drawings, in which:

BRIEF DESCRIPTION OF THE DRAWINGS

FIGS. 9–11 are graphs respectively showing transverse ray fan plots, and field curvature and distortion, longitudinal spherical aberration, and lateral chromatic aberration curves for the lens system in accordance with a third exemplary embodiment of the present invention;

FIGS. 12–14 are graphs respectively showing transverse ray fan plots, and field curvature and distortion, longitudinal spherical aberration, and lateral chromatic aberration curves for the lens system in accordance with a fourth exemplary embodiment of the present invention;

FIGS. 15–17 are graphs respectively showing transverse ray fan plots, and field curvature and distortion, longitudinal spherical aberration, and lateral chromatic aberration curves for the lens system in accordance with a fifth exemplary embodiment of the present invention;

FIGS. 18–20 are graphs respectively showing transverse ray fan plots, and field curvature and distortion, longitudinal spherical aberration, and lateral chromatic aberration curves for the lens system in accordance with a sixth exemplary embodiment of the present invention.

DETAILED DESCRIPTION OF EXEMPLARY EMBODIMENTS OF THE INVENTION

Figure 1:
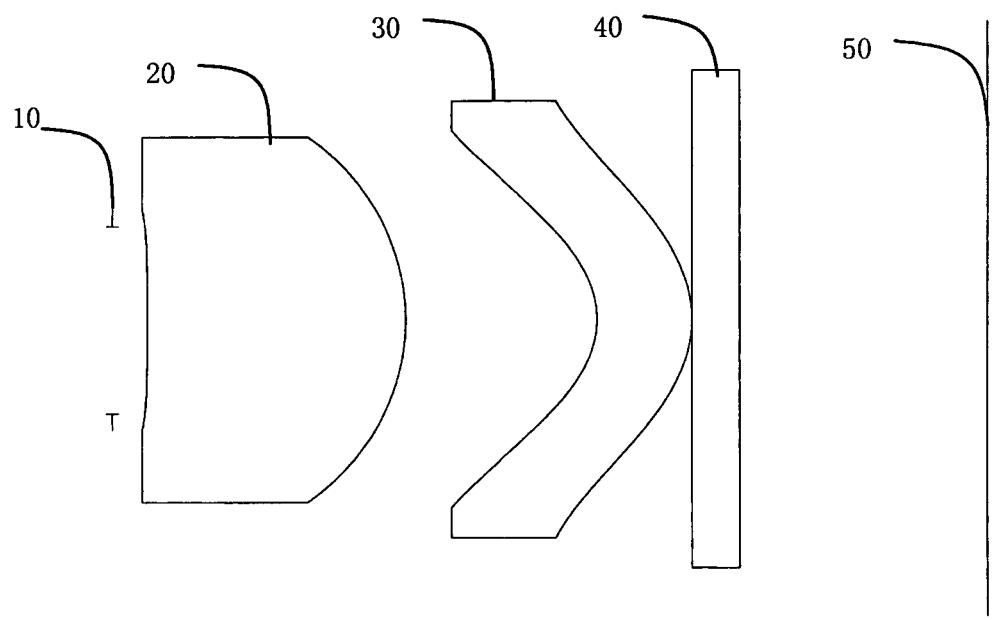
FIG. 1 is a schematic, cross-sectional view of an image pick-up lens system in accordance with the present invention, and also showing an image pick-up surface.
Figure 2:
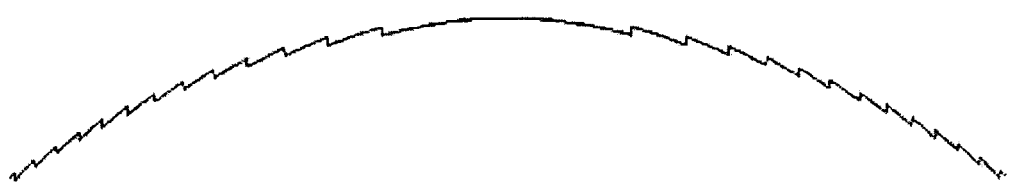
FIG. 2 is an enlarged, cross-sectional view of a diffraction grating on a convex surface of a first lens of the lens system of FIG. 1.

FIG. 1 shows a schematic configuration of an image pick-up lens system in accordance with the present invention. Light beams incident from an object side sequentially pass through an aperture stop 10, a first lens 20, and a meniscus-shaped second lens 30 having a concave surface facing the object side along a predetermined light path. The light beams are converged onto an image pick-up surface 50 of an image pickup device such as a CCD or a CMOS. Usually, a cover glass 40 is provided between the second lens 30 and the image pick-up surface 50. The first lens 20 has positive refracting power, and has a diffraction grating formed on a convex surface (not labeled) facing the image side. The opposite surface (not labeled) of the first lens 20 facing the object side is aspheric. The convex surface of the first lens 20 is defined as a second surface, and said opposite surface of the first lens 20 is defined as a first surface. FIG. 2 shows a sectional view of the diffraction grating of the first lens 20. The second lens 30 has positive refracting power and at least one aspheric surface. Alternatively, the second lens 30 has negative refracting power.

The aperture stop 10 is arranged closest to the object in order to narrow down an incident angle of chief rays onto the image pick-up surface 50 located at the image side. In addition, this arrangement of the aperture stop 10 helps shorten a total length of the system.

In order to provide compactness and excellent optical performance, the system satisfies the following condition:

$$1.4 < T/f < 1.7, \quad (1)$$

wherein, f is a focal length of the system, and T is a length from the aperture stop 10 to the image pick-up surface 50. Condition (1) is for limiting the total length of the system. The total length of the system is directly related to optical performance of the system, especially when controlling the emitting angle of the chief rays in order to achieve an approximate image side telecentric characteristic light path. With such light path, the system can have improved optical performance as well as achieve compactness.

Preferably, the first lens satisfied the following conditions:

$$0.5 < f1/f < 0.8, \text{ and} \quad (2)$$

$$0.002 < R2/R1 < 0.300, \quad (3)$$

wherein, f1 is a focal length of the first lens 20, f is the focal length of the system, R1 is an absolute value of a radius of curvature of the first surface of the first lens 20, and R2 is an absolute value of a radius of curvature of the second surface of the first lens 20. Condition (2) is for correcting monochromatic aberrations, and providing both compactness and a desirable distribution of refracting power. In one aspect, when the ratio f1/f is above the lower limit of 0.5, the system provides satisfactory total refracting power and keeps the high-order spherical aberration, high-order coma and lateral chromatic aberration of the system in a controlled range. In another aspect, when the ratio f1/f is below the upper limit of 0.8, the system is compact and provides satisfactory total refracting power. Condition (3) governs a distribution of refracting power for the first lens 20, in order to correct monochromatic aberrations. When the ratio R2/R1 is above the upper limit of 0.300, R2 is too large and the refracting power of the second surface of the first lens is reduced. Thus, the emitting angle of the chief rays is too large. When the ratio R2/R1 is below the lower limit of 0.002, R2 is too small. Thus, aberration of the system is necessarily increased and is difficult to appropriately correct.

The concave surface of the second lens 30 is defined as a third surface (not labeled), and an opposite convex surface of the second lens 30 on the image side is defined as a fourth surface (not labeled). Preferably, the second lens 30 is aspheric on both the third and fourth surfaces thereof, and satisfies the following condition:

$$-0.5 < R3/[f \times (n-1)] < -0.2, \quad (4)$$

wherein, R3 is an absolute value of a radius of curvature of the third surface of the second lens 30, n is the refractive index of the second lens 30, and $R3/[f \times (n-1)]$ is a ratio of a focal length of the third surface of the second lens 30 to the focal length of the system.

Condition (4) is for correcting field curvature and obtaining a flat field. In one aspect, when the ratio $R3/[f \times (n-1)]$ is above the lower limit of −0.5, the negative Petzval's Sum produced by the third surface of the second lens 30 can compensate the total positive Petzval's Sum produced by the first and second surfaces of the first lens 20 and the fourth surface of the second lens 30. Thus, it is relatively easy to correct field curvature of the system. In another aspect, when the ratio $R3/[f \times (n-1)]$ is below the upper limit of −0.2, the negative refracting power produced by the third surface of the second lens 30 can effectively compensate and correct the positive coma and lateral chromatic aberrations produced by the first lens 20. In addition, the radius of curvature R3 of the third surface of the second lens 30 is not so small as to increase the high-order aberrations of the system. Furthermore, the radius of curvature R3 of the third surface of the second lens 30 has the smallest absolute value among the four absolute values of radiuses of curvature R1, R2, R3 and R4 of the first and second lenses 20, 30. Thus, in order to correct field curvature without producing high-order aberrations, the third surface of the second lens 30 is concave relative to the aperture stop 10.

Further, the first lens 20 satisfies the following condition;

$$-450 < C_2 \times (f1/R_n^2) < -250, \quad (5)$$

wherein, $C_2$ is the power phase coefficient of the phase function of the diffraction grating formed on the second surface of the first lens 20, and $R_n$ is a normalization radius of the diffraction grating.

Condition (5) is for limiting the share of refracting power of the diffraction grating on the second surface of the first lens 20. In one aspect, when the ratio Gan $C_2 \times (f1/R_n^2)$ is above the lower limit of −450, the diffraction grating has a relatively large critical dimension and is relatively easy to manufacture. In another aspect, when the ratio $C_2 \times (f1/R_n^2)$ is below the upper limit of −250, the diffraction grating has proper refracting power and can appropriately correct chromatic aberration of the system.

Also, in order to simplify the required manufacturing technology and reduce manufacturing costs, the first lens 20 and the second lens 30 are made from a same plastic or a same resin. Preferably, the first lens 20 and the second lens are made from a zeonex material or an equivalent material having low water absorbency.

Further, the fourth surface of the second lens 30 preferably has gradually varying refractive characteristics from a central portion thereof near an optical axis of the system to a peripheral edge portion thereof. Thus, a central portion of the second lens 30 diverges light rays and a peripheral edge portion of the second lens 30 converges light rays, so that meridional/sagittal sections easily coincide. This feature further enhances the optical image performance in wide angles of the system.

The above explanations outline fundamental constituent features of the present invention. Examples of the system will be described below with reference to FIGS. 3–23. It is to be understood that the invention is not limited to these examples. The following are symbols used in each exemplary embodiment.

T: length from the aperture stop 10 to the image pick-up surface 50
f: focal length of the system
FNo: F number
$\omega$: half angle of field of view
$2\omega$: angle of field of view
$\theta$: emitting angle of chief rays
R: radius of curvature
d: distance between surfaces on the optical axis of the system
Nd: refractive index of lens
$\nu$: Abbe constant In each example, the first surface of the first lens 20 and the third and fourth surfaces of the second lens 30 are all aspheric. The first lens 20 and the second lens 30 are made from the 480R type of zeonex material, which is available from the Japanese Zeon Corporation. The 480R type of zeonex material has the refractive index of 1.531170 and the Abbe constant of 56.0. Alternatively, the first lens 20 and the second lens 30 are made from another material having characteristics similar to those of the 480R type of zeonex material. The shape of each aspheric surface is provided by expression 1 below. Expression 1 is based on a Cartesian coordinate system, with the vertex of the surface being the origin, and the optical axis extending from the vertex being the x-axis.

Expression 1:

$$x = \frac{ch^2}{1+\sqrt{1-(k+1)c^2h^2}} + \sum A_i h^i$$

where, h is a height from the optical axis to the surface, c is a vertex curvature, k is a conic constant, and $A_i$ are i-th order correction coefficients of the aspheric surface.

The diffraction grating is formed on the second surface of the first lens 20 and the diffraction grating profile is provided by the phase modulation expression 2 below.

Expression 2:

$$\phi(r) = \sum_i C_{2i}\left(\frac{r}{R_n}\right)^{2i} = C_2\left(\frac{r}{R_n}\right)^2 + C_4\left(\frac{r}{R_n}\right)^4 + C_6\left(\frac{r}{R_n}\right)^6 + C_8\left(\frac{r}{R_n}\right)^8 + C_{10}\left(\frac{r}{R_n}\right)^{10}$$

where, $\phi(r)$ is equal to an integer multiple of $2\pi$, r is the radius of a next zone of the diffraction grating profile, $R_n$ is the normalization radius of the diffraction grating, and $C_{2i}$ is the 2i-th power phase coefficient of the phase function of the diffraction grating.

EXAMPLE 1

Tables 1, 2 and 3 show lens data of the first exemplary embodiment of the present invention.

TABLE 1 f = 4.45 mm  T = 7.10 mm  FNo = 2.8  $\omega$ = 30°  $\theta$ = 20.63°

| Surface | R (mm) | d (mm) | k |
|---|---|---|---|
| stop 10 | infinite | 0.32422 | 0 |
| 1st | −36.26165 | 2.06168 | 39.99942 |
| 2nd | −1.84341 | 2.10295 | −0.01468 |
| 3rd | −0.77410 | 0.77413 | −0.81116 |
| 4th | −1.01577 | 0 | −1.08487 |

TABLE 2

| | Surface | | |
|---|---|---|---|
| | 1st | 3rd | 4th |
| Aspheric coefficient | A4 = −3.02893 × 10⁻² | A4 = 1.25073 × 10⁻² | A4 = −7.89761 × 10⁻³ |
| | A6 = −3.86915 × 10⁻² | A6 = 1.08837 × 10⁻¹ | A6 = 1.98411 × 10⁻² |
| | A8 = 2.59667 × 10⁻² | A8 = −3.68565 × 10⁻² | A8 = 1.19565 × 10⁻³ |
| | A10 = −2.33557 × 10⁻² | A10 = 4.89630 × 10⁻³ | A10 = −1.90099 × 10⁻³ |
| | A12 = 5.35056 × 10⁻³ | A12 = 6.05722 × 10⁻⁴ | A12 = 2.77063 × 10⁻⁴ |

TABLE 3

| Surface | $R_n$ | Diffractive phase coefficients | | | | |
|---|---|---|---|---|---|---|
| | | $C_2$ | $C_4$ | $C_6$ | $C_8$ | $C_{10}$ |
| 2nd | 1 | −103.64841 | 54.79922 | −58.60833 | 27.24557 | −4.58486 |

Figure 3A:
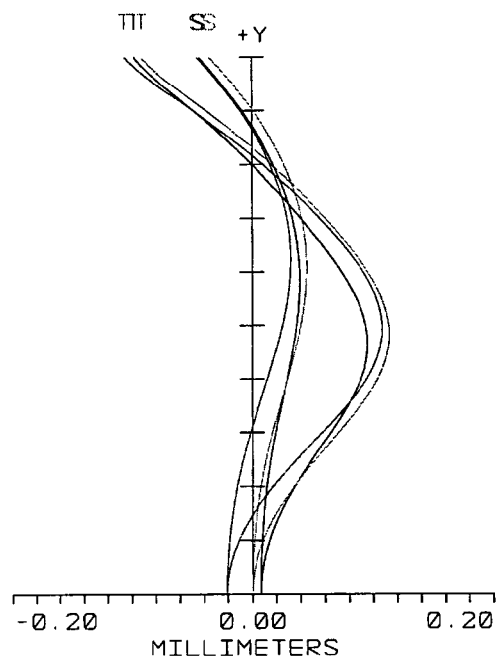
FIGS. 3–5 are graphs respectively showing transverse ray fan plots, and field curvature and distortion, longitudinal spherical aberration, and lateral chromatic aberration curves for the lens system in accordance with a first exemplary embodiment of the present invention.
Figure 3B:
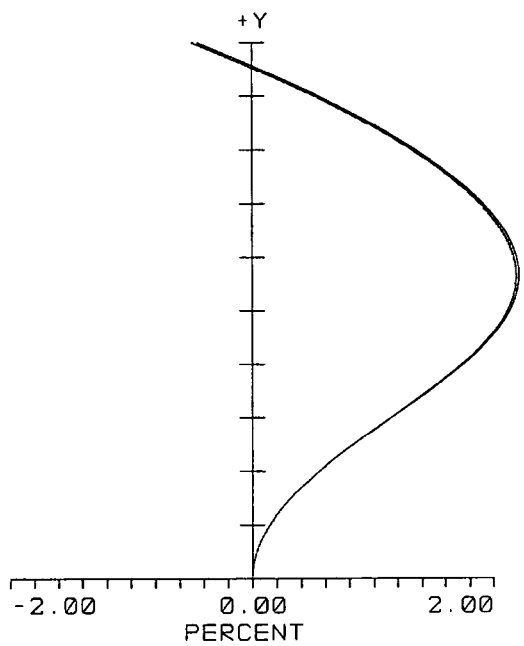
Figure 4:
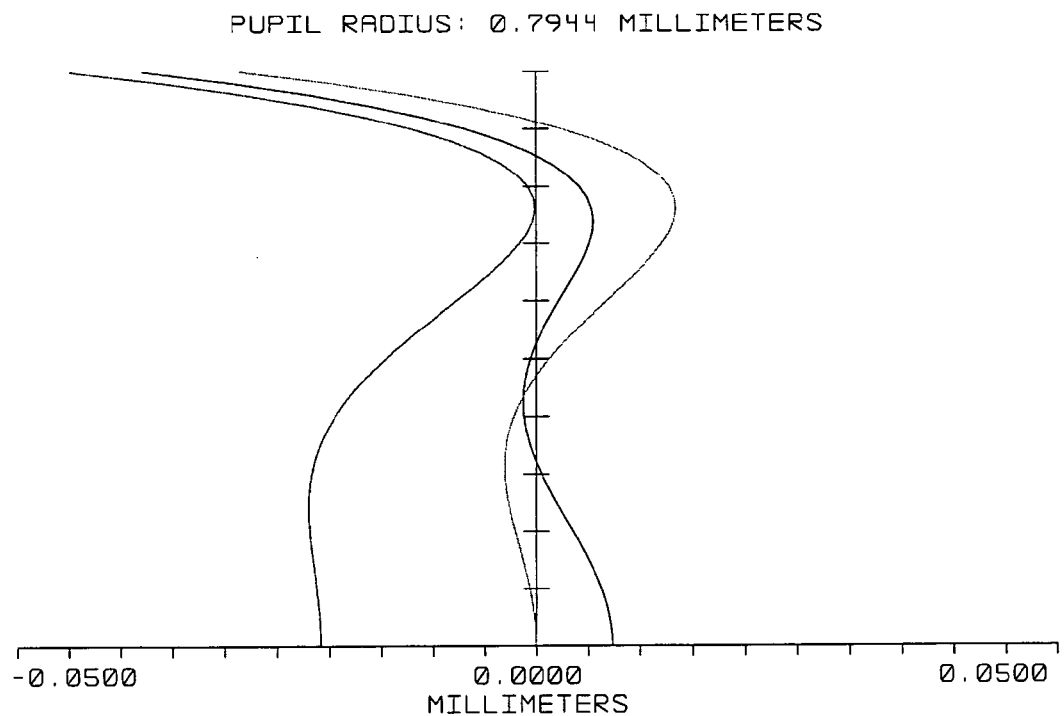
Figure 5:
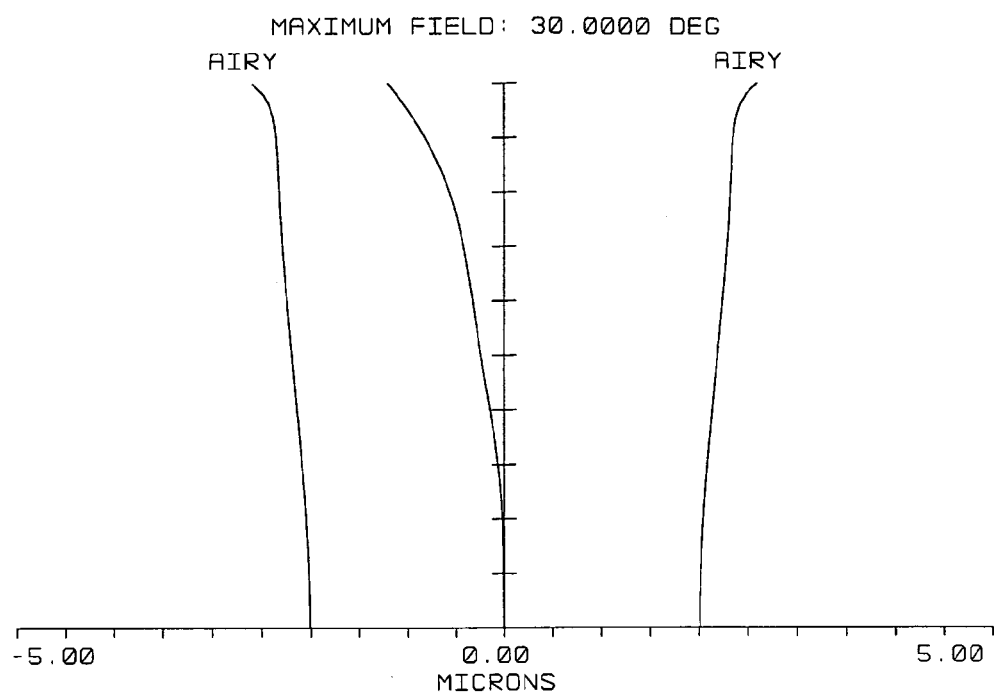

FIGS. 3–5 are graphs of aberrations (transverse ray fan plots, and field curvature/distortion, longitudinal spherical aberration and lateral chromatic aberration curves) of the image pick-up lens system of Example 1. FIGS. 3A and 3B respectively show field curvature and distortion curves. In the example, the height of the diffraction grating is 1.12 μm, the smallest critical dimension is 20.4 μm, and the diffraction grating has 32 zones.

EXAMPLE 2

Tables 4, 5 and 6 show lens data of the second exemplary embodiment of the present invention.

TABLE 4

| f = 4.45 mm T = 7.02 mm FNo = 2.8 ω = 30° θ = 21.75° | | | |
|---|---|---|---|
| Surface | R (mm) | d (mm) | k |
| stop 10 | infinite | 0.43428 | 0 |
| $1^{st}$ | −13.56418 | 1.85312 | −25.36645 |
| $2^{nd}$ | −1.71643 | 2.29548 | 0 |
| $3^{rd}$ | −0.82041 | 0.91266 | −0.97172 |
| $4^{th}$ | −1.08275 | 0 | −1.24805 |

TABLE 5

| | Surface | | |
|---|---|---|---|
| | $1^{st}$ | $3^{rd}$ | $4^{th}$ |
| Aspheric coefficient | A4 = −5.62918 × 10$^{-2}$<br>A6 = −8.93042 × 10$^{-3}$<br>A8 = −1.48773 × 10$^{-2}$<br>A10 = −200788 × 10$^{-2}$<br>A12 = 3.28972 × 10$^{-3}$ | A4 = 1.54953 × 10$^{-2}$<br>A6 = 7.39516 × 10$^{-2}$<br>A8 = −4.08341 × 10$^{-2}$<br>A10 = 1.05413 × 10$^{-3}$<br>A12 = −1.01292 × 10$^{-3}$ | A4 = 7.71837 × 10$^{-3}$<br>A6 = 1.43555 × 10$^{-2}$<br>A8 = −2.03002 × 10$^{-3}$<br>A10 = −3.58474 × 10$^{-4}$<br>A12 = 8.64371 × 10$^{-5}$ |

TABLE 6

| | | Diffractive phase coefficients | | | | |
|---|---|---|---|---|---|---|
| Surface | $R_n$ | $C_2$ | $C_4$ | $C_6$ | $C_8$ | $C_{10}$ |
| $2^{nd}$ | 1 | −100.6055 | 37.02940 | −28.82641 | 10.81211 | −1.89877 |

Figure 6A:
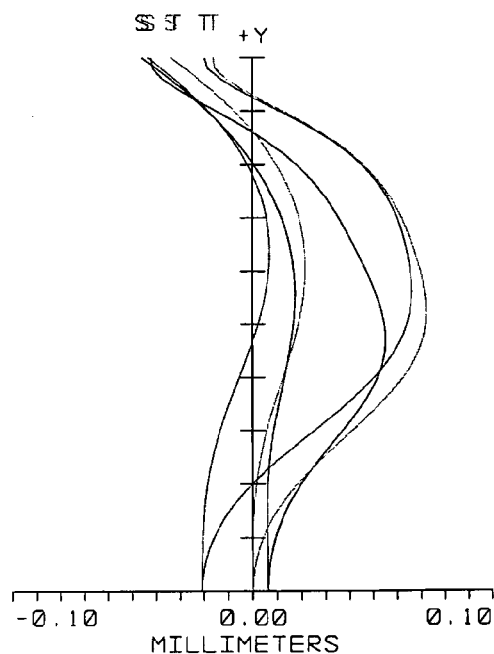
FIGS. 6–8 are graphs respectively showing transverse ray fan plots, and field curvature and distortion, longitudinal spherical aberration, and lateral chromatic aberration curves for the lens system in accordance with a second exemplary embodiment of the present invention.
Figure 6B:
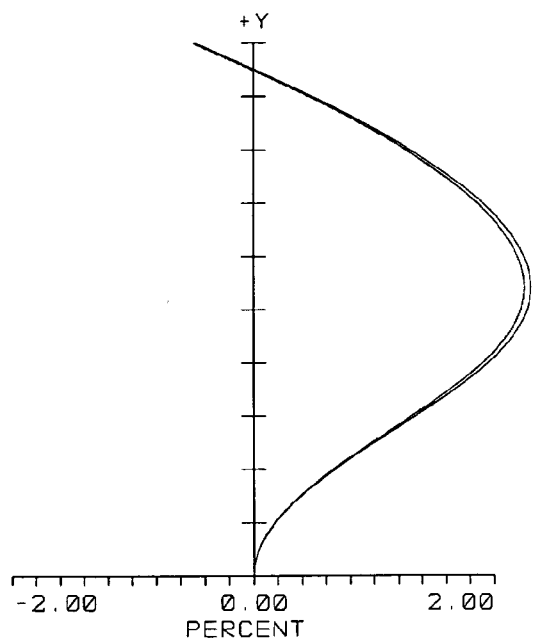
Figure 7:
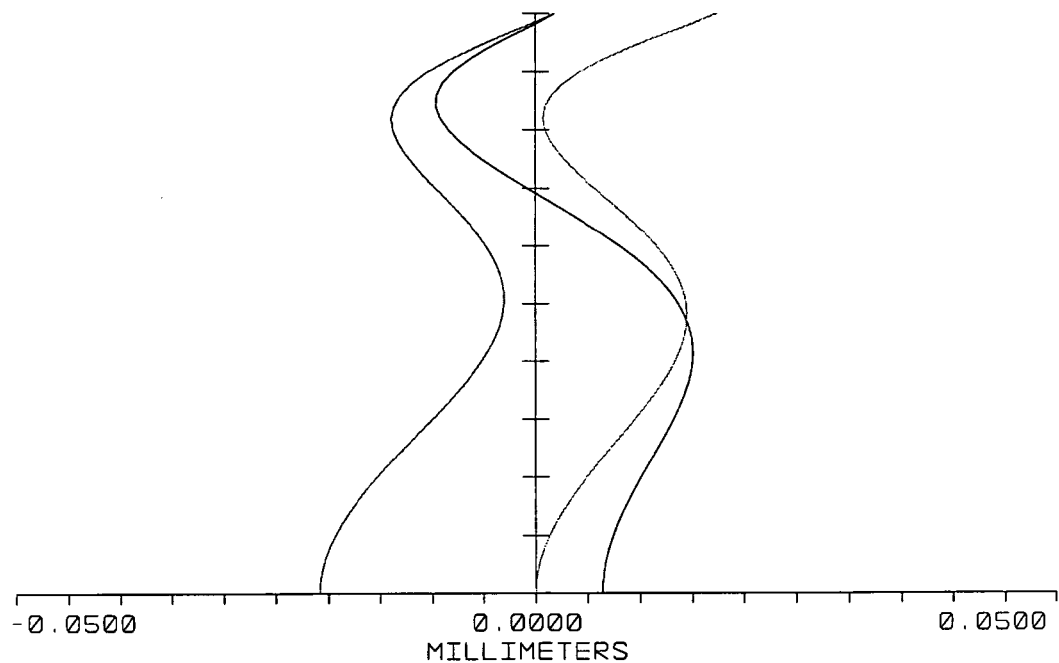
Figure 8:
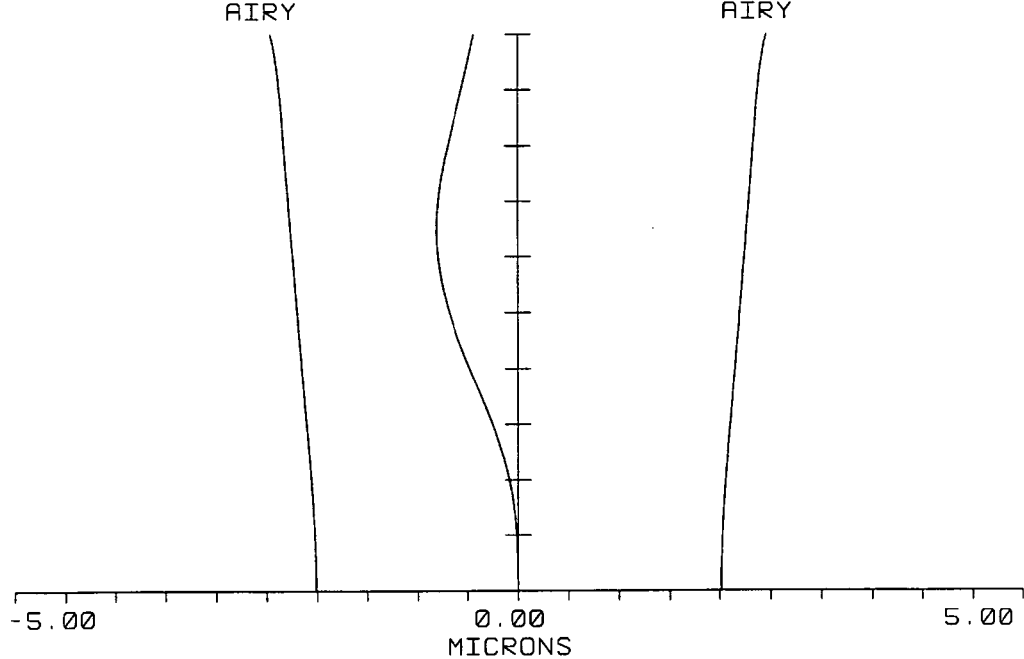

FIGS. 6–8 are graphs of aberrations (transverse ray fan plots, and field curvature/distortion, longitudinal spherical aberration and lateral chromatic aberration curves) of the image pick-up lens system of Example 2. FIGS. 6A and 6B respectively show field curvature and distortion curves. In the example, the height of the diffraction grating is 1.12 μm, the smallest critical dimension is 32.7 μm, and the diffraction grating has 34 zones.

EXAMPLE 3

Tables 7, 8 and 9 show lens data of the third exemplary embodiment of the present invention.

TABLE 7

| f = 4.46 mm T = 7.47 mm FNo = 2.8 ω = 30° θ = 19.88° | | | |
|---|---|---|---|
| Surface | R (mm) | d (mm) | k |
| stop 10 | infinite | 0.57775 | 0 |
| $1^{st}$ | 16.57991 | 2.55544 | −40 |
| $2^{nd}$ | −2.06782 | 2.17008 | −0.07152 |
| $3^{rd}$ | −0.75198 | 0.76066 | −1.00293 |
| $4^{th}$ | −0.95479 | 0 | −1.32112 |

TABLE 8

| | Surface | | |
|---|---|---|---|
| | $1^{st}$ | $3^{rd}$ | $4^{th}$ |
| Aspheric coefficient | A4 = 2.22667 × 10$^{-2}$<br>A6 = −2.15795 × 10$^{-2}$<br>A8 = 2.59967 × 10$^{-2}$<br>A10 = −2.33557 × 10$^{-2}$<br>A12 = 5.35056 × 10$^{-3}$ | A4 = 3.32236 × 10$^{-2}$<br>A6 = 2.55229 × 10$^{-2}$<br>A8 = −9.60022 × 10$^{-3}$<br>A10 = 1.85434 × 10$^{-3}$<br>A12 = −1.52554 × 10$^{-4}$ | A4 = 7.80384 × 10$^{-3}$<br>A6 = 5.32107 × 10$^{-3}$<br>A8 = 3.23791 × 10$^{-3}$<br>A10 = −2.47060 × 10$^{-4}$<br>A12 = 2.50832 × 10$^{-5}$ |

TABLE 9

| | | Diffractive phase coefficients | | | | |
|---|---|---|---|---|---|---|
| Surface | $R_n$ | $C_2$ | $C_4$ | $C_6$ | $C_8$ | $C_{10}$ |
| $2^{nd}$ | 1 | −100.33427 | 27.04023 | −15.34538 | 4.26623 | −0.48662 |

Figure 9A:
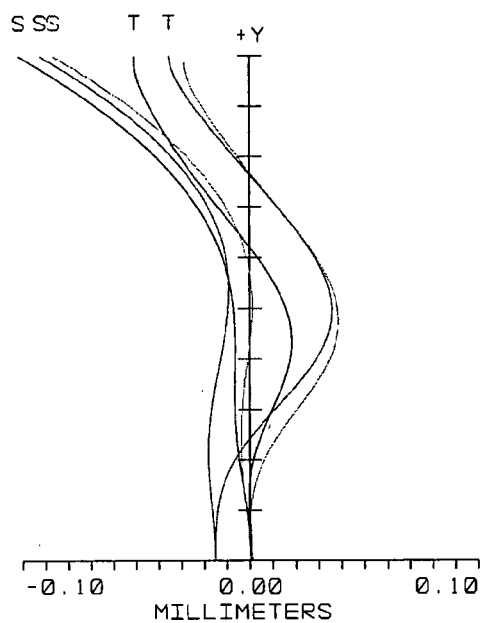
Figure 9B:
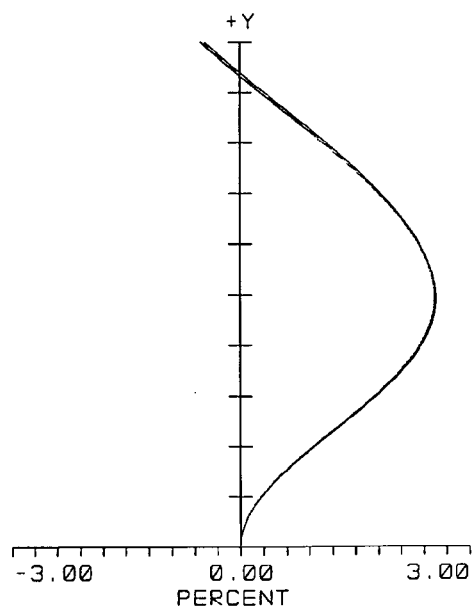
Figure 10:
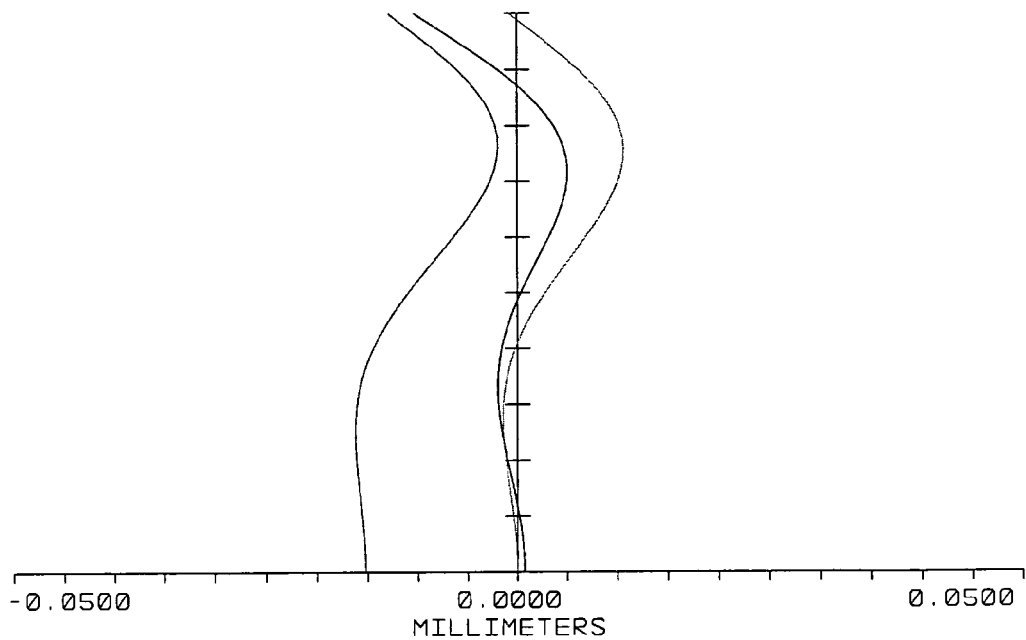

FIGS. 9–11 are graphs of aberrations (transverse ray fan plots, and field curvature/distortion, longitudinal spherical aberration and lateral chromatic aberration curves) of the image pick-up lens system of Example 3. FIGS. 9A and 9B respectively show field curvature and distortion curves. In the example, the height of the diffraction grating is 1.12 μm, the smallest critical dimension is 17.1 μm, and the diffraction grating has 43 zones.

EXAMPLE 4

Tables 10, 11 and 12 show lens data of the fourth exemplary embodiment of the present invention.

TABLE 10

| f = 4.45 mm T = 7.08 mm FNo = 2.8 ω = 30° θ = 21.06° | | | |
|---|---|---|---|
| Surface | R (mm) | d (mm) | k |
| stop 10 | infinite | 0.39407 | 0 |
| $1^{st}$ | −403.5031 | 2.09252 | 39.99745 |
| $2^{nd}$ | −1.83465 | 2.11644 | −0.22943 |
| $3^{rd}$ | −0.80758 | 0.89738 | −0.83429 |
| $4^{th}$ | −1.07602 | 0.15034 | −1.04344 |

TABLE 11

| | Surface | | |
|---|---|---|---|
| | 1st | 3rd | 4th |
| Aspheric coefficient | A4 = −4.15935 × 10$^{-2}$ | A4 = 1.25885 × 10$^{-3}$ | A4 = 4.24111 × 10$^{-2}$ |
| | A6 = 1.32034 × 10$^{-2}$ | A6 = −7.15246 × 10$^{-3}$ | A6 = 3.30947 × 10$^{-2}$ |
| | A8 = −9.30343 × 10$^{-2}$ | A8 = 1.71085 × 10$^{-3}$ | A8 = −4.42155 × 10$^{-3}$ |
| | A10 = 1.18144 × 10$^{-1}$ | A10 = 3.38242 × 10$^{-2}$ | A10 = 6.74427 × 10$^{-4}$ |
| | A12 = −7.12737 × 10$^{-2}$ | A12 = −3.41000 × 10$^{-4}$ | A12 = −1.00923 × 10$^{-5}$ |

TABLE 12

| | | Diffractive phase coefficients | | | |
|---|---|---|---|---|---|
| Surface | $R_n$ | $C_2$ | $C_4$ | $C_6$ | $C_8$ | $C_{10}$ |
| 2nd | 1.5 | −200.16421 | 51.22938 | −50.40445 | −19.73101 | 27.81240 |

Figure 13:
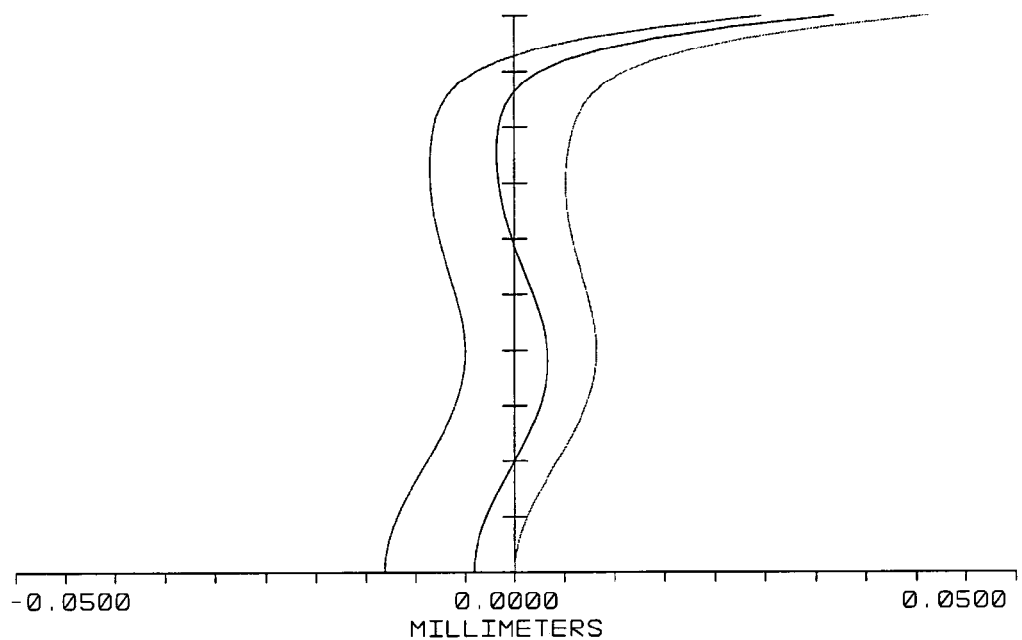
Figure 14:
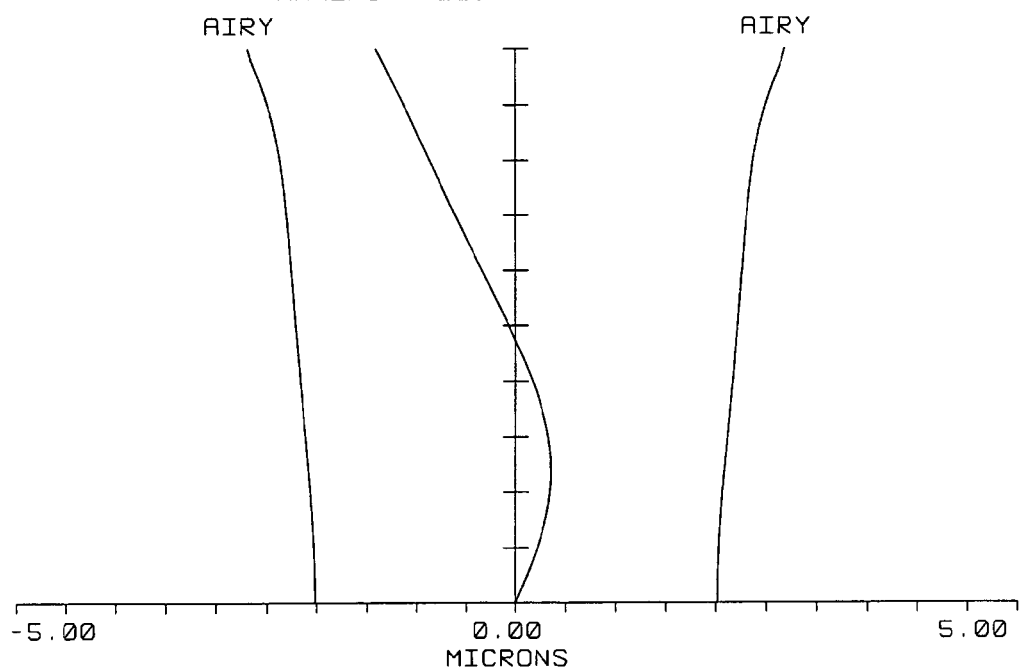

FIGS. 12–14 are graphs of aberrations (transverse ray fan plots, and field curvature/distortion, longitudinal spherical aberration and lateral chromatic aberration curves) of the image pick-up lens system of Example 4. FIGS. 12A and 12B respectively show field curvature and distortion curves. In the example, the height of the diffraction grating is 1.12 μm, the smallest critical dimension is 27.0 μm and the diffraction grating has 35 zones.

EXAMPLE 5

Tables 13, 14 and 15 show lens data of the fifth exemplary embodiment of the present invention.

TABLE 13

| f = 4.44 mm T = 7.11 mm FNo = 2.8 ω = 30° θ = 20.23° | | | |
|---|---|---|---|
| Surface | R (mm) | d (mm) | k |
| stop 10 | infinite | 0.29228 | 0 |
| 1st | −29.34387 | 2.00532 | 20 |
| 2nd | −1.80344 | 1.87692 | −0.38944 |
| 3rd | −0.75970 | 0.70991 | −0.89037 |
| 4th | −1.00991 | 0 | −2.07236 |

TABLE 14

| | Surface | | |
|---|---|---|---|
| | 1st | 3rd | 4th |
| Aspheric coefficient | A4 = −2.75860 × 10$^{-2}$ | A4 = −2.47925 × 10$^{-3}$ | A4 = −1.50617 × 10$^{-2}$ |
| | A6 = −4.40541 × 10$^{-2}$ | A6 = −1.35963 × 10$^{-2}$ | A6 = 1.23652 × 10$^{-1}$ |
| | A8 = 2.59667 × 10$^{-2}$ | A8 = 1.18636 × 10$^{-2}$ | A8 = −5.23237 × 10$^{-2}$ |
| | A10 = −2.33557 × 10$^{-2}$ | A10 = −6.21782 × 10$^{-3}$ | A10 = 1.04562 × 10$^{-2}$ |
| | A12 = 5.35056 × 10$^{-3}$ | A12 = 1.06548 × 10$^{-3}$ | A12 = −6.30539 × 10$^{-4}$ |

TABLE 15

| | | Diffractive phase coefficients | | | |
|---|---|---|---|---|---|
| Surface | $R_n$ | $C_2$ | $C_4$ | $C_6$ | $C_8$ | $C_{10}$ |
| 2nd | 1 | −101.8455 | 47.68104 | −56.26698 | 29.20772 | −5.44700 |

Figure 15A:
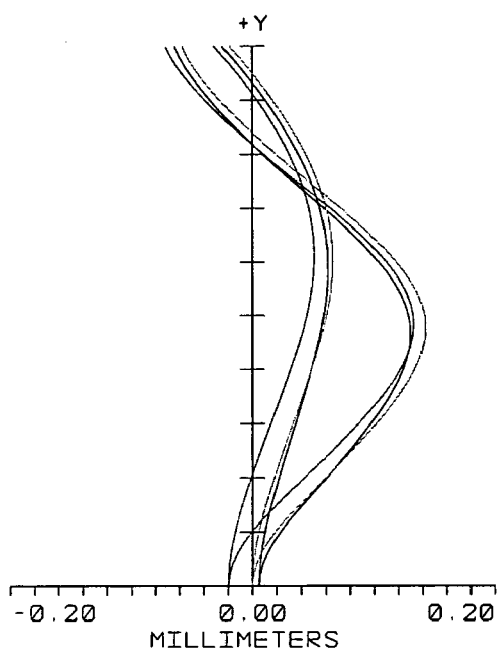
Figure 15B:
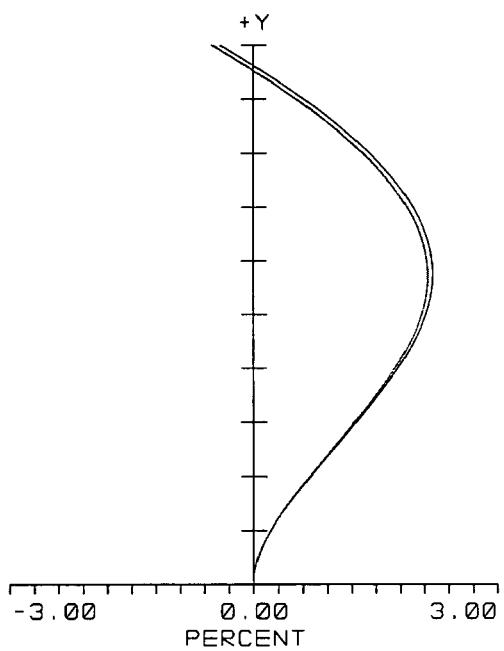
Figure 16:
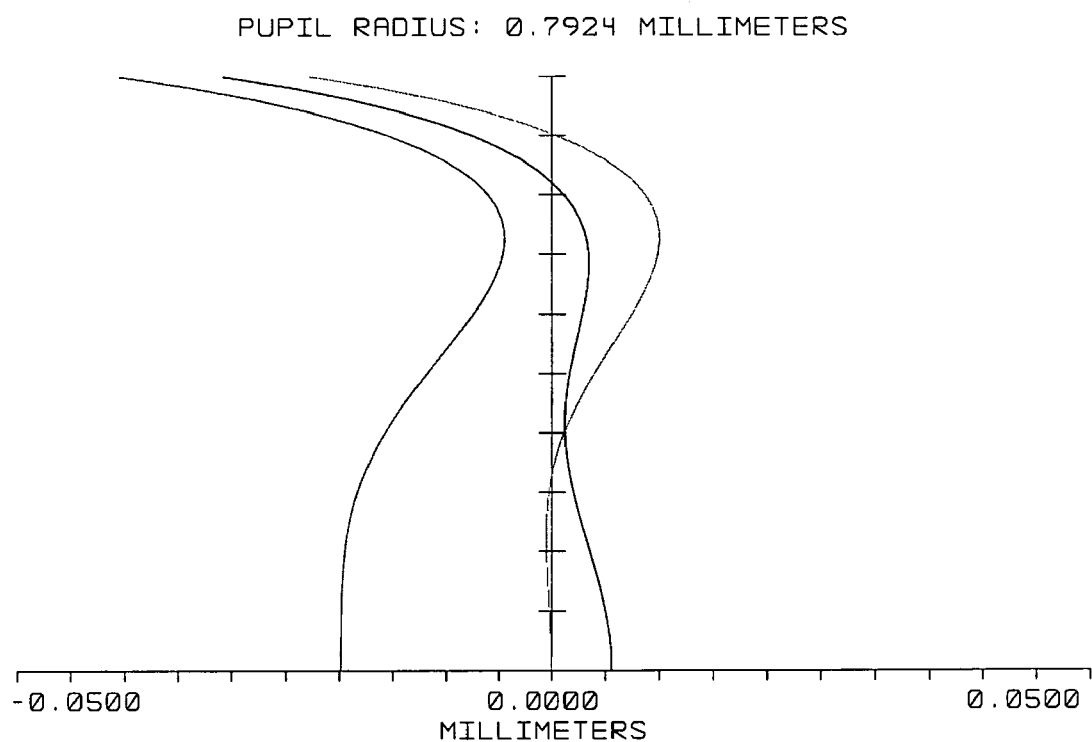

FIGS. 15–17 are graphs of aberrations (transverse ray fan plots, and field curvature/distortion, longitudinal spherical aberration and lateral chromatic aberration curves) of the image pick-up lens system of Example 5. FIGS. 15A and 15B respectively show field curvature and distortion curves. In the example, the height of the diffraction grating is 1.12 μm, the smallest critical dimension is 19.8 μm, and the diffraction grating has 31 zones.

EXAMPLE 6

Tables 16, 17 and 18 show lens data of the sixth exemplary embodiment of the present invention.

TABLE 16

| f = 4.39 mm T = 7.04 mm FNo = 2.8 ω = 30° θ = 19.80° | | | |
|---|---|---|---|
| Surface | R (mm) | d (mm) | k |
| stop 10 | infinite | 0.25644 | 0 |
| 1st | −26.41873 | 1.95156 | 40 |
| 2nd | −1.83877 | 1.90768 | −0.52147 |
| 3rd | −0.76919 | 0.69091 | −1.80861 |
| 4th | −0.99078 | 0 | −0.93426 |

TABLE 17

| | Surface | | |
|---|---|---|---|
| | $1^{st}$ | $3^{rd}$ | $4^{th}$ |
| Aspheric coefficient | $A4 = -2.73580 \times 10^{-2}$ | $A4 = -7.38983 \times 10^{-3}$ | $A4 = -2.63828 \times 10^{-1}$ |
| | $A6 = -4.45891 \times 10^{-2}$ | $A6 = -1.45028 \times 10^{-2}$ | $A6 = 1.78925 \times 10^{-1}$ |
| | $A8 = 2.59667 \times 10^{-2}$ | $A8 = 1.38786 \times 10^{-2}$ | $A8 = -5.14949 \times 10^{-2}$ |
| | $A10 = -2.33557 \times 10^{-2}$ | $A10 = -8.42679 \times 10^{-3}$ | $A10 = 5.42869 \times 10^{-3}$ |
| | $A12 = 5.35056 \times 10^{-3}$ | $A12 = 1.64417 \times 10^{-3}$ | $A12 = 3.02293 \times 10^{-4}$ |

TABLE 18

| | | Diffractive phase coefficients | | | | |
|---|---|---|---|---|---|---|
| Surface | $R_n$ | $C_2$ | $C_4$ | $C_6$ | $C_8$ | $C_{10}$ |
| $2^{nd}$ | 1 | −104.60274 | 59.65265 | −81.280142 | 46.82513 | −9.41838 |

Figure 19:
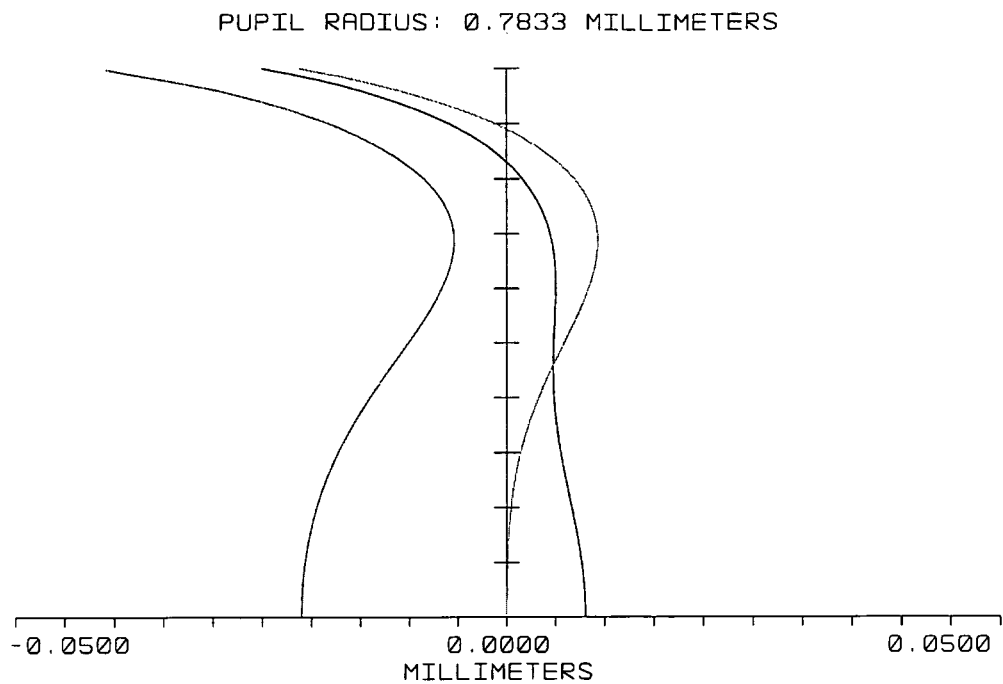
Figure 20:
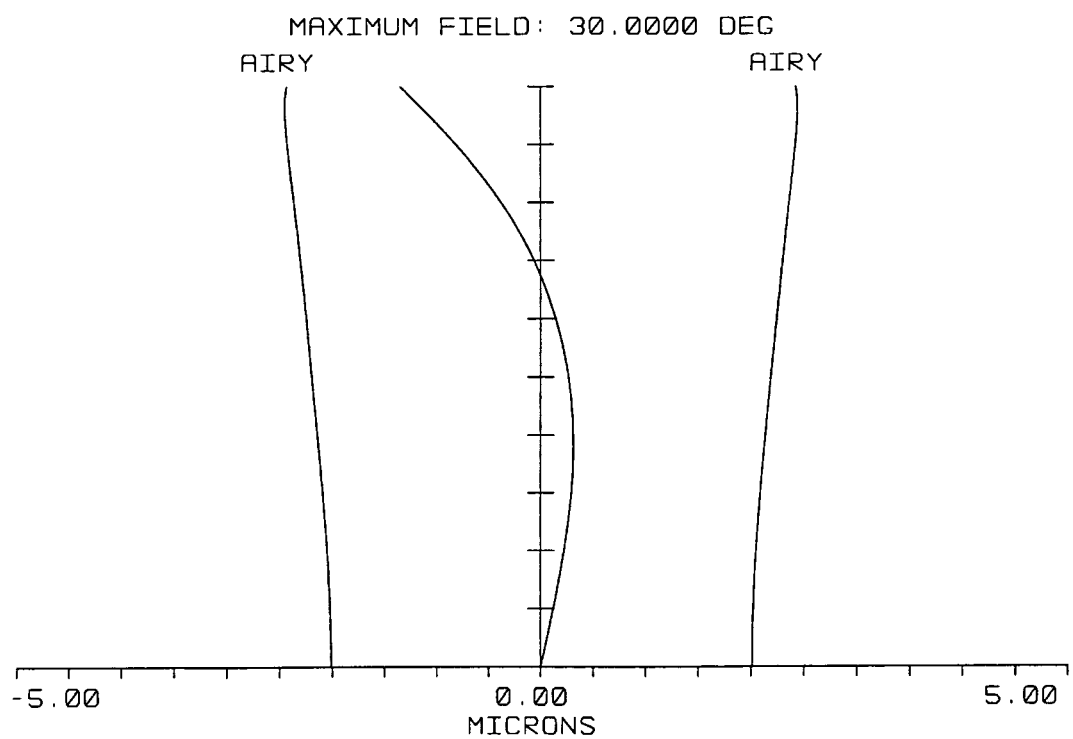

FIGS. 18–20 are graphs of aberrations (transverse ray fan plots, and field curvature/distortion, longitudinal spherical aberration and lateral chromatic aberration curves) of the image pick-up lens system of Example 6. FIGS. 18A and 18B respectively show field curvature and distortion curves. In the example, the height of the diffraction grating is 1.12 μm, the smallest critical dimension is 19.0 μm, and the diffraction grating has 30 zones.

EXAMPLE 7

Tables 19, 20 and 21 show lens data of the seventh exemplary embodiment of the present invention.

TABLE 19

| f = 4.45 mm T = 7.30 mm FNo = 2.8 ω = 30° θ = 19.34° | | | |
|---|---|---|---|
| Surface | R (mm) | d (mm) | k |
| stop 10 | infinite | 0.30529 | 0 |
| $1^{st}$ | −39.88829 | 2.10131 | 40 |
| $2^{nd}$ | −1.75760 | 1.65726 | −0.54617 |
| $3^{rd}$ | −0.77400 | 0.78909 | −1.04892 |
| $4^{th}$ | −1.06693 | 0 | −2.12323 |

TABLE 20

| | Surface | | |
|---|---|---|---|
| | $1^{st}$ | $3^{rd}$ | $4^{th}$ |
| Aspheric coefficient | $A4 = -2.71880 \times 10^{-2}$ | $A4 = -3.10223 \times 10^{-3}$ | $A4 = -2.29069 \times 10^{-2}$ |
| | $A6 = -3.94699 \times 10^{-2}$ | $A6 = -1.06529 \times 10^{-2}$ | $A6 = 9.97254 \times 10^{-2}$ |
| | $A8 = 2.59667 \times 10^{-2}$ | $A8 = 8.53320 \times 10^{-3}$ | $A8 = -4.98676 \times 10^{-2}$ |
| | $A10 = -2.33557 \times 10^{-2}$ | $A10 = -4.49004 \times 10^{-3}$ | $A10 = 1.13739 \times 10^{-2}$ |
| | $A12 = 5.35056 \times 10^{-3}$ | $A12 = 7.53803 \times 10^{-4}$ | $A12 = -9.07746 \times 10^{-4}$ |

TABLE 21

| | | Diffractive phase coefficients | | | | |
|---|---|---|---|---|---|---|
| Surface | $R_n$ | $C_2$ | $C_4$ | $C_6$ | $C_8$ | $C_{10}$ |
| $2^{nd}$ | 1 | −103.02867 | 41.66289 | −46.20204 | 23.24619 | −4.23622 |

Figure 21A:
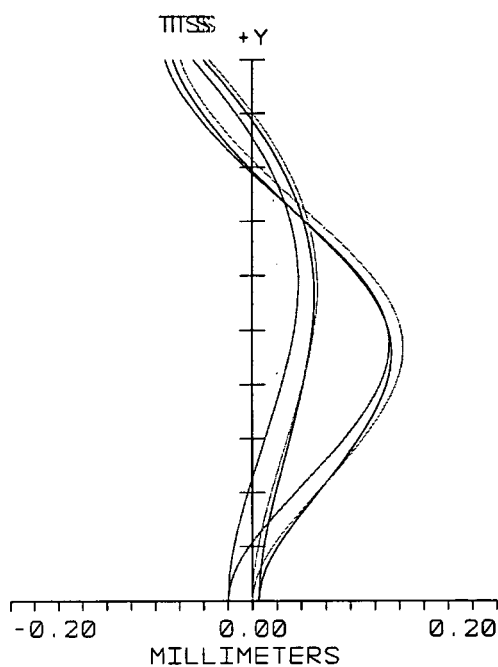
FIGS. 21–23 are graphs respectively showing transverse ray fan plots, and field curvature and distortion, longitudinal spherical aberration, and lateral chromatic aberration curves for the lens system in accordance with a seventh exemplary embodiment of the present invention.
Figure 21B:
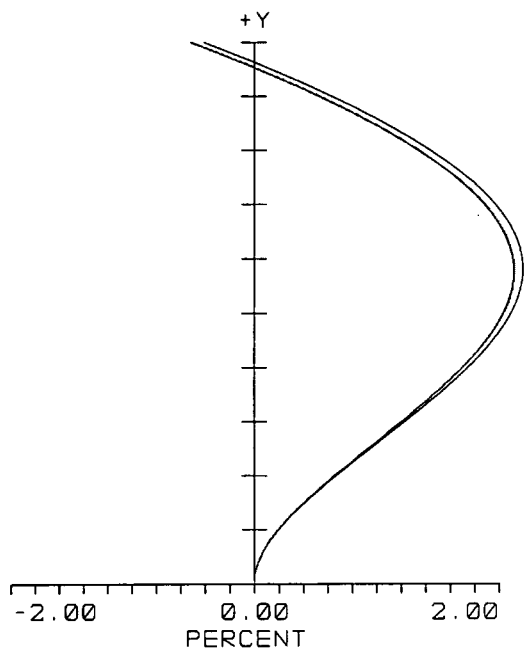
Figure 22:
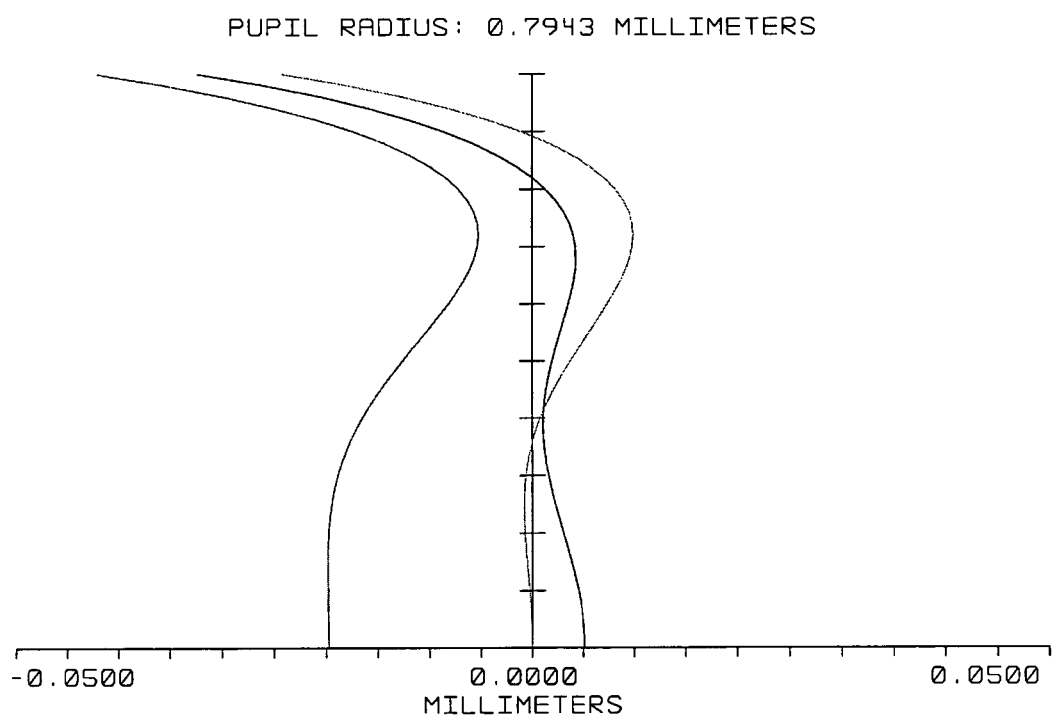
Figure 23:
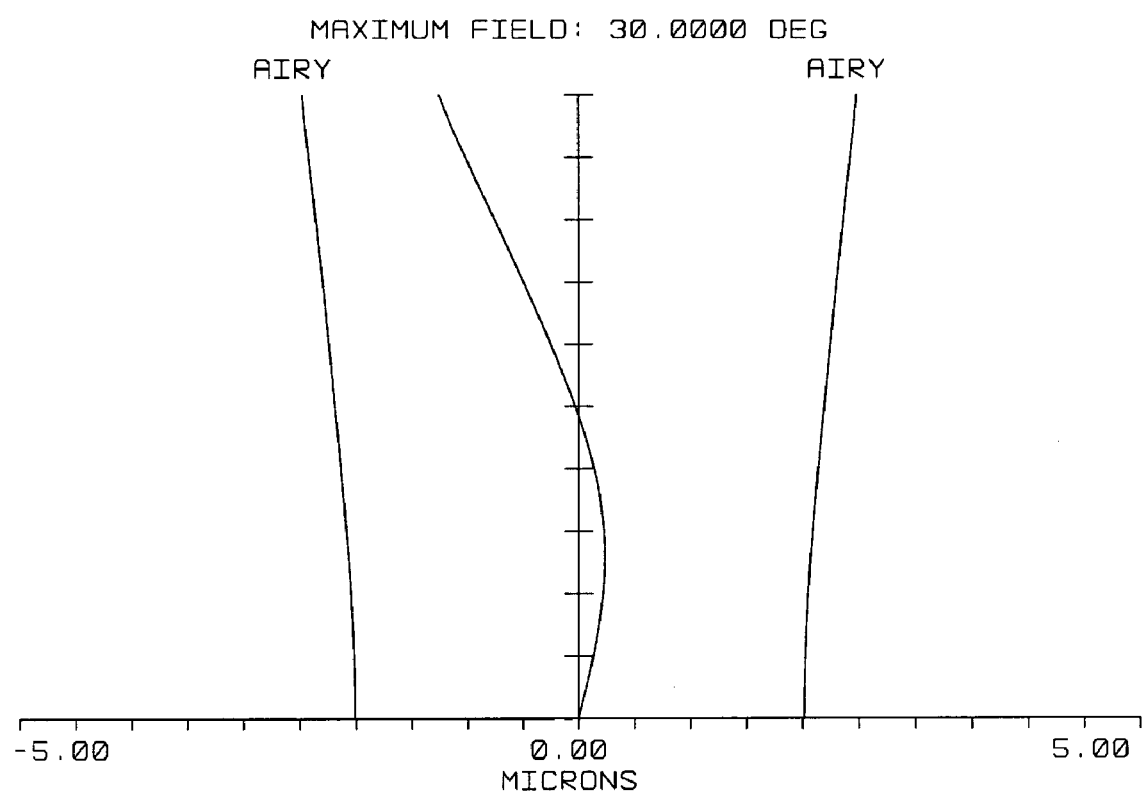

FIGS. 21–23 are graphs of aberrations (transverse ray fan plots, and field curvature/distortion, longitudinal spherical aberration and lateral chromatic aberration curves) of the image pick-up lens system of Example 7. FIGS. 21A and 21B respectively show field curvature and distortion curves. In the example, the height of the diffraction grating is 1.12 μm, the smallest critical dimension is 18.8 μm, and the diffraction grating has 33 zones.

Table 22 compares focal lengths and other parameters across Examples 1 through 7.

TABLE 22

|  | Example | | | | | | |
|---|---|---|---|---|---|---|---|
|  | 1 | 2 | 3 | 4 | 5 | 6 | 7 |
| FNo | 2.8 | 2.8 | 2.8 | 2.8 | 2.8 | 2.8 | 2.8 |
| 2ω (°) | 60 | 60 | 60 | 60 | 60 | 60 | 60 |
| θ (°) | 20.63 | 21.75 | 19.88 | 21.06 | 20.23 | 19.80 | 19.34 |
| T (mm) | 7.1 | 7.02 | 7.47 | 7.08 | 7.11 | 7.04 | 7.3 |
| f (mm) | 4.45 | 4.45 | 4.46 | 4.45 | 4.44 | 4.39 | 4.45 |
| T/f | 1.60 | 1.58 | 1.68 | 1.59 | 1.60 | 1.60 | 1.64 |
| f1/f | 0.76 | 0.75 | 0.77 | 0.74 | 0.75 | 0.78 | 0.72 |
| R2/R1 | 0.05 | 0.13 | 0.12 | 0.005 | 0.06 | 0.07 | 0.04 |
| R3/[f × (n − 1)] | −0.33 | −0.34 | −0.32 | −0.34 | −0.32 | −0.33 | −0.33 |
| $C_2 \times f1/R_n^2$ | −350.5 | −335.8 | −344.6 | −294.2 | −339.1 | −358.2 | −330.1 |

As seen in the above-described Examples 1–7, the present invention provides a low-cost image pick-up lens system with a field angle of at least 60°. The total length of the system is small, and the system appropriately corrects fundamental aberrations.

It is to be understood that the invention may be embodied in other forms without departing from the spirit thereof. Thus, the present exemplary embodiments are to be considered in all respects as illustrative and not restrictive, and the invention is not to be limited to the details given herein.

What is claimed is:

1. An image pick-up lens system comprising:
   an aperture stop;
   a first lens; and
   a meniscus-shaped second lens having a concave surface on an object side,
   wherein, the aperture slop, the first lens and the second lens are aligned in that order from the object side to an image side, the first lens has positive refracting power and has a diffraction grating formed on a convex surface thereof on the image side, and the second lens has positive refracting power.

2. The image pick-up lens system in accordance with claim 1, wherein a surface of the first lens on the object side is aspheric.

3. The image pick-up lens system in accordance with claim 1, wherein the following condition is satisfied:

$$1.4 < T/f < 1.7, \qquad (1)$$

wherein, f is a focal length of the system, and T is a length from the aperture stop to an image pick-up surface of the image side.

4. The image pick-np lens system in accordance with claim 1, wherein the second lens has ax least one aspheric surface.

5. The image pick-up lens system in accordance with claim 1, wherein the second lens is aspheric on both the concave surface thereof and another major surface thereof.

6. The image pick-up lens system in accordance with claim 4, wherein the following conditions are satisfied:

$$0.5 < f1/f < 0.8, \qquad (2) \text{ and}$$

$$0.002 < R2/R1 < 0.300, \qquad (3)$$

wherein, f1 is a focal length of the first lens, R1 is an absolute value of a radius of curvature of a first surface of the first lens on the object side, and R2 is an absolute value of a radius of curvature of the convex surface of the first lens on the image side.

7. The image pick-up lens system in accordance with claim 1, wherein the first lens satisfies the following condition:

$$-0.5 < R3/[f \times (n-1)] < -0.2, \qquad (1)$$

wherein, R3 is an absolute value of a radius of curvature of a third surface of the second lens on the object side, f is a focal length of the system, and n is a refractive index of a material of the first lens.

8. The image pick-up lens system in accordance with claim 1, wherein the following condition is satisfied:

$$-450 < C_2 \times (f1/R_n^2) < -250, \qquad (1)$$

wherein, $C_2$ is the power phase coefficient of the phase function of the diffraction grating surface of the first lens, f1 is a focal length of the first lens, and $R_n$ is a normalization radius of the diffraction grating.

9. The image pick-up lens system in accordance with claim 1, wherein the first and second lenses are made front a same plastic or a same resin.

10. The image pick-up lens system in accordance with claim 9, wherein the first and second Lenses are made from a polyolefin resin or cyclo-olefin polymer material having low water absorbency.

11. An image pick-up lens system comprising:
    an aperture stop;
    a first lens; and
    a meniscus-shaped second lens having a concave surface on an object side,
    wherein the aperture stop, the first lens and the second lens are aligned in that order from the object side to an image side, the first lens has positive refracting power and has a diffraction grating formed on a convex surface on the image side, and the second lens has negative refracting power.

12. The image pick-up lens system in accordance with claim 11, wherein a surface of the first lens on the object side is aspheric.

13. The image pick-up lens system in accordance with claim 11, wherein the following condition is satisfied:

$$1.4 < T/f < 1.7, \qquad (1)$$

wherein, f is a focal length of the system, T is a length from the aperture stop to an image pick-up surface of the image side.

14. The image pick-up lens system in accordance with claim 11, wherein the second lens has at least one aspheric surface.

15. The image pick-up lens system in accordance with claim 11, wherein the second lens is aspheric on both the concave surface thereof and a surface thereof on the image side.

16. The image pick-up lens system in accordance with claim 15, wherein the following conditions are satisfied:

$$0.5 < f1/f < 0.8, \quad (2)$$

and $$0.002 < R2/R1 < 0.300, \quad (3)$$

wherein, f1 is a focal length of the first lens, R1 is an absolute value of a radius of curvature of a first surface of the first lens on the object side, and R2 is an absolute value of a radius of curvature of the convex surface of the first lens on the image side.

17. The image pick-up lens system in accordance with claim 11, wherein the first lens satisfies the following condition:

$$-0.5 < R3/[f \times (n-1)] < -0.2, \quad (1)$$

wherein, R3 is an absolute value of a radius of curvature of a third surface of the second lens on the object side, f is a focal length of the system, and n is a refractive index of a material of the first lens.

18. The image pick-up lens system in accordance with claim 11, wherein the following condition is satisfied:

$$-450 < C_2 \times (f1/R_n^2) < -250, \quad (1)$$

wherein, $C_2$ is the power phase coefficient of the phase function of the diffraction grating surface of the first lens, f1 is a focal length of the first lens, and $R_n$ is a normalization radius of the diffraction grating.

19. An image pick-up lens system comprising:

an aperture stop providing a light path therethrough;

a first lens disposed next to said aperture stop in said light path and having at least one diffraction grating formed in said light path; and a meniscus-shaped second lens disposed next to said first lens and located in said light path, and having a convex surface facing an image pickup surface and being distal from said first lens in said light path, wherein the following condition is satisfied:

$$-450 < C_2 \times (f1/R_n^2) < -250, \quad (1)$$

wherein, $C_1$ is the power phase coefficient of the phase function of the diffraction grating surface of the first lens, f1 is a focal length of the first lens, and $R_n$ is a normalization radius of the at least one diffraction grating.

20. The image pick-up lens system in accordance with claim 19, wherein the followings condition is satisfied:

$$1.4 < T/f < 1.7; \quad (2)$$

wherein f is a focal length of said system, and T is a length from said aperture stop to said image pick-up surface along said light path.

* * * * *